(12) United States Patent
Takano et al.

(10) Patent No.: US 8,787,166 B2
(45) Date of Patent: Jul. 22, 2014

(54) COMMUNICATION NETWORK CONTROL SYSTEM, RADIO COMMUNICATION APPARATUS, AND COMMUNICATION NETWORK CONTROL METHOD

(75) Inventors: Yusuke Takano, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 12/886,867

(22) Filed: Sep. 21, 2010

(65) Prior Publication Data

US 2011/0007633 A1 Jan. 13, 2011

Related U.S. Application Data

(63) Continuation of application No. 11/755,255, filed on May 30, 2007, now abandoned.

(30) Foreign Application Priority Data

Jun. 29, 2006 (JP) .................................. 2006-179604

(51) Int. Cl.
*H04L 12/26* (2006.01)

(52) U.S. Cl.
USPC .......................................... 370/235; 370/231

(58) Field of Classification Search
USPC .................... 370/231, 235, 356, 462
See application file for complete search history.

(56) References Cited

U.S. PATENT DOCUMENTS

| 6,028,851 | A | 2/2000 | Persson et al. | |
|---|---|---|---|---|
| 7,043,233 | B2 | 5/2006 | Hasegawa | |
| 2002/0075803 | A1* | 6/2002 | Zaharychuk et al. | 370/231 |
| 2002/0186657 | A1 | 12/2002 | Jain et al. | |
| 2003/0012138 | A1* | 1/2003 | Abdelilah et al. | 370/231 |
| 2004/0047437 | A1* | 3/2004 | Hamiti et al. | 375/326 |
| 2004/0160979 | A1* | 8/2004 | Pepin et al. | 370/462 |
| 2004/0184461 | A1 | 9/2004 | Forssell et al. | |
| 2005/0148321 | A1 | 7/2005 | Igarashi et al. | |
| 2006/0133276 | A1 | 6/2006 | Cole | |
| 2006/0171350 | A1 | 8/2006 | Taniguchi et al. | |
| 2006/0242588 | A1 | 10/2006 | Ybarra et al. | |
| 2007/0094691 | A1 | 4/2007 | Gazdzinski | |
| 2008/0212575 | A1* | 9/2008 | Westberg | 370/356 |

FOREIGN PATENT DOCUMENTS

| CN | 1539225 A | 6/2002 |
|---|---|---|
| EP | 1 318 690 A1 | 6/2003 |
| JP | 05-183495 | 7/1993 |
| JP | 05-252103 | 9/1993 |
| JP | 2000-115061 | 4/2000 |

(Continued)

OTHER PUBLICATIONS

Notification of Reasons for Refusal dated Feb. 23, 2011 with English translation.

*Primary Examiner* — Myron K Wyche
(74) *Attorney, Agent, or Firm* — Whitham Curtis Christofferson & Cook, PC

(57) ABSTRACT

The present invention can provide a radio communication apparatus comprising an antenna which receives a restriction signal from a radio base station, a reception circuit which decodes the restriction signal received by said antenna, and a control circuit which controls the radio communication apparatus, in which the control circuit can be adapted to select appropriately a speech outgoing/incoming scheme for performing communication with the radio base station on the basis of the restriction signal from the radio base station. As the speech outgoing/incoming scheme, a domain scheme or a speech communication scheme is used. In addition, the present invention further provides a communication network control system using the radio communication apparatus, and a communication network control method.

4 Claims, 5 Drawing Sheets

(56) References Cited

FOREIGN PATENT DOCUMENTS

| | | |
|---|---|---|
| JP | 2002-290436 | 10/2002 |
| JP | 2003-199145 | 7/2003 |
| JP | 2004-015761 | 1/2004 |
| JP | 2004-266330 | 9/2004 |
| WO | WO 2004/045173 | 5/2004 |

* cited by examiner

COMMUNICATION NETWORK CONTROL SYSTEM, RADIO COMMUNICATION APPARATUS, AND COMMUNICATION NETWORK CONTROL METHOD

CROSS-REFERENCE TO RELATED APPLICATION

This application is a divisional application of U.S. Ser. No. 11/755,255 filed May 30, 2007, now abandoned.

This application is a continuation application of application Ser. No. 11/755,255 filed May 30, 2007, now abandoned, and makes reference to, incorporates the same herein, and claims all benefits accruing under 35 U.S.C. §119 from an application for Communication Network Control System, Radio Communication Apparatus, And Communication Network Control Method earlier filed in the Japanese Patent Office on Jun. 29, 2006, and duly assigned with the application No. 2006- 179604.

BACKGROUND OF THE INVENTION

1. Field of the Invention:

The present invention relates to a communication network control system, a radio communication apparatus used in the system, a communication network control method, and a radio base station.

2. Description of Background Technology:

The number of subscribers of cellular phones has increased yearly and recently exceeded 90 million. That is, about ⅔ the population of Japan possess cellular phone sets. On the other hand, the communication network resources are finite, and many cellular phone owners simultaneously communicate in a densely populated area, a disaster area, or the like, in particular. This may cause congestion in the communication network.

As a related technique for avoiding such communication network congestion, Japanese Unexamined Patent Publication (KOKAI of the Japanese Patent Application) No. 05-252103 (Patent Document 1) discloses a digital car phone system which increases the number of channels at the time of traffic congestion in a radio base station. In this system, upon detecting traffic congestion, a radio base station transmits a half rate request. signal to a car phone terminal. Upon receiving the half rate request signal, the car phone terminal starts half-rate communication through the radio base station.

Japanese Unexamined Patent Publication (KOKAI of the Japanese Patent Application) No. 05-183495 (Patent Document 2) discloses a method of performing congestion control in radio communication. According to this method, a base station calculates the traffic amount of a radio channel by detecting the communication schemes used by terminals under communication and the number of terminals. The base station then imposes call limitation on terminals on the basis of the communication scheme used by the terminals under communication, the number of terminals, and the calculated traffic amount.

In addition, Japanese Unexamined Patent Publication (KOKAI of the Japanese Patent Application) No. 2004-15761 (Patent Document 3) discloses a congestion control system in radio access. In this system, upon detecting congestion, a terminal notifies a radio base station of the corresponding information. Upon receiving the congestion notification, the radio base station instructs a transcoder to suppress the bit rate of a speech CODEC (Coder/Decoder), thereby canceling the congestion state.

According to the background technology described above, although congestion occurs on the circuit domain side used in general speech communication, sufficient capacity may remain on the packet domain side used in packet communication for e-mail and the like.

At the time of a disaster, e.g., an earthquake, when it is expected that communication network congestion occurs, nobody can afford to take time to input an e-mail message, and hence it is preferable to allow speech communication.

SUMMARY OF THE INVENTION

An exemplary object is that the present invention can provide a radio communication apparatus (e.g., a cellular phone set) which allows speech communication at the time of communication network congestion by using a proper speech outgoing/incoming scheme. More specifically, there is provided a communication network control system which allows speech communication under deterioration in sound quality to a minimum necessary level by causing a radio communication apparatus to automatically select a proper domain, speech communication scheme, or CODEC in accordance with a congestion state from a radio base station. It should be noted that, in this case, the term "CODEC" indicates a device or software for conversion of data, e.g., compression or decompression of data.

An exemplary aspect of the present invention is that a radio communication apparatus of the present invention comprises an antenna which receives a restriction signal from a radio base station, a reception circuit which decodes the restriction signal received by the antenna, and a control circuit which controls the radio communication apparatus, wherein the control circuit can select appropriately a speech outgoing/incoming scheme for performing communication with the radio base station on the basis of the restriction signal from the radio base station.

According to the present invention, there are provided a communication network control system which allows proper speech communication even at the time of communication network congestion, a radio communication apparatus used in the system, a communication network control method, and a radio base station.

DETAILED DESCRIPTION OF EXEMPLARY EMBODIMENTS

Several exemplary embodiments of the present invention will be described below with reference to the accompanying drawings. However, the respective exemplary embodiments described below do not limit the technical scope of the present invention.

First Exemplary Embodiment

The first exemplary embodiment of the present invention will be described with reference to FIGS. 1 to 5.

Figure 1:
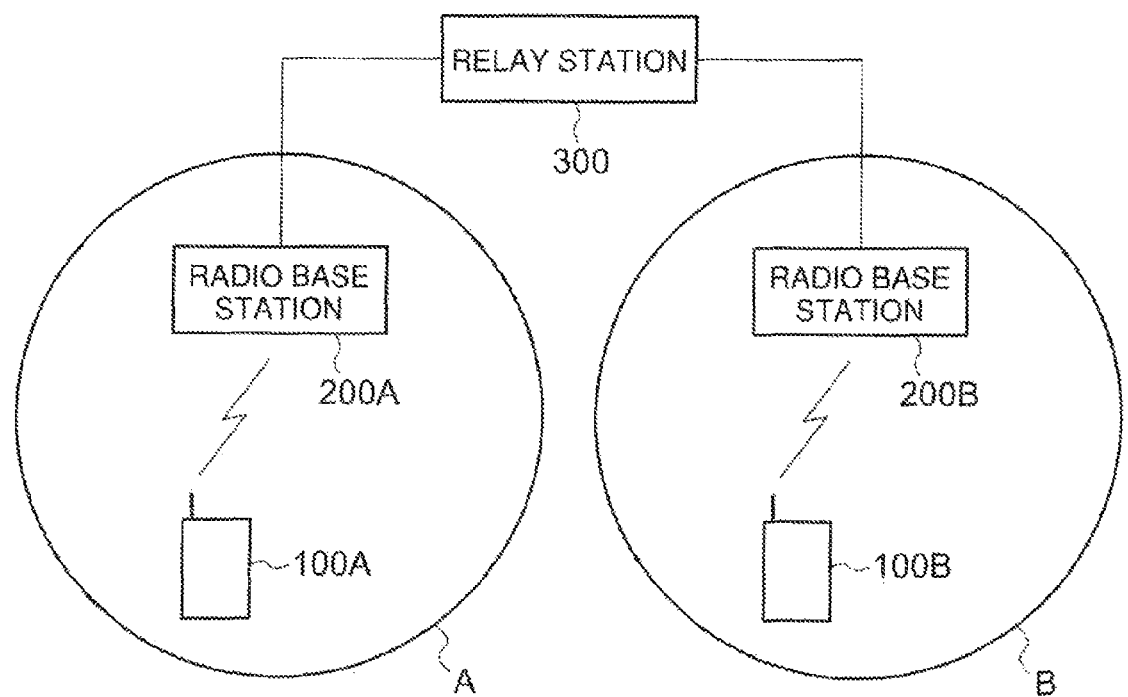
FIG. 1 is a schematic view showing the arrangement of a communication network control system according to the first exemplary embodiment of the present invention.

FIG. 1 shows the arrangement of a communication network control system of $2^{nd}$ Generation or $3^{rd}$ Generation according to the first exemplary embodiment. The communication network control system according to the first exemplary embodiment comprises radio communication apparatuses 100A and 100B, radio base stations 200A and 200B, and a relay station 300. Referring to FIG. 1, reference symbols A and B denote radio cover areas of the radio base stations 200A and 200B.

Figure 2:
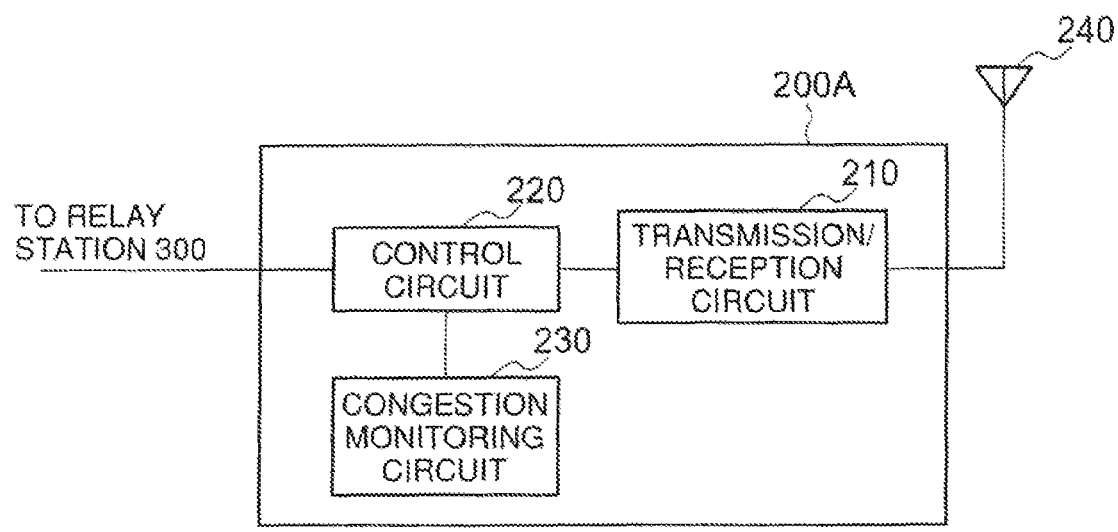
FIG. 2 is a schematic view showing the arrangement of a radio base station in the communication network control system according to the first exemplary embodiment of the present invention.

FIG. 2 shows the arrangement of the radio base station 200A. The radio base station 200A comprises a transmission/reception circuit 210, control circuit 220, congestion monitoring circuit 230, and antenna 240. The, radio base station 200A can be a communication apparatus which can transmit/receive radio signals to/from a radio communication apparatus, e.g., an AP (Access Point) in a wireless LAN system or a base station in a cellular phone system. Since the radio base station 200B may have the same arrangement as that of the radio base station 200A, the arrangement of the radio base station 200A will be described here.

The transmission/reception circuit 210 performs necessary processing for a restriction signal input from the control circuit 220, and transmits the resultant signal to the radio communication apparatus 100A through an antenna. The transmission/reception circuit 210 performs necessary processing (e.g., modulation, encoding, or A/D conversion) for data received from the radio base station 200A, and outputs the resultant data to the control circuit 220. The transmission/reception circuit 210 also performs necessary processing (e.g., demodulation, decoding, or D/A conversion) for data input from the control circuit 220, and transmits the resultant data to the radio communication apparatus 100A.

The control circuit 220 transmits information about the congestion state of a circuit domain or packet domain, a restriction ratio, or the like, which is input from the congestion monitoring circuit 230, as a restriction signal to the radio communication apparatus 100A. The control circuit 220 transmits data received from the radio communication apparatus 100A to the relay station 300, and transmits data received from the relay station 300 to the radio communication apparatus 100A. The control circuit 220 can comprise, for example, a circuit including a CPU (Central Processing Unit), MPU (Micro Processing Unit), or the like as an arithmetic processing function.

The congestion monitoring circuit 230 monitors the congestion state of a circuit domain or packet domain, and outputs data about the congestion state and a restriction ratio to the control circuit 220.

The antenna 240 transmits data input from the transmission/reception circuit 210 to the radio communication apparatus 100A. The antenna 240 outputs data received from the radio communication apparatus 100A to the transmission/reception circuit 210.

Figure 3:
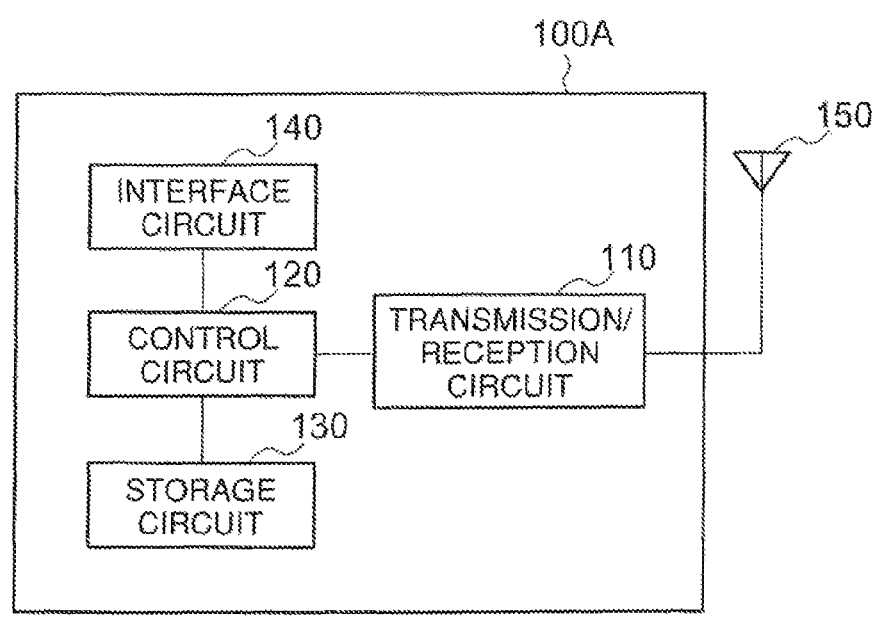
FIG. 3 is a schematic view showing the arrangement of a radio communication apparatus in the communication network control system according to the first exemplary embodiment of the present invention.

FIG. 3 shows the arrangement of the radio communication apparatus 100A. The radio communication apparatus 100A comprises a transmission/reception circuit 110, control circuit 120, storage circuit 130, interface circuit 140, and antenna 150. The radio communication apparatus 100A can be various communication apparatuses each having a function of communicating with a radio base station, e.g., a PC (Personal Computer), a wireless LAN (Local Area Network) apparatus, a cellular phone set, a fixed telephone set, a PHS (Personal Handy phone System), or a PDA (Personal Digital Assistant). In this case, since the radio communication apparatus 100B may have the same arrangement as that of the radio communication apparatus 100A, the arrangement of the radio communication apparatus 100A will be described.

The transmission/reception circuit 110 performs necessary processing (e.g., demodulation, decoding, or D/A conversion) for a restriction signal received from the radio base station 200A through an antenna, and outputs the resultant signal to the control circuit 120. The transmission/reception circuit 110 performs necessary processing (e.g., modulation, encoding, or A/D conversion) for data input from the control circuit 120, and transmits the resultant data to the radio base station 200A through an antenna.

The control circuit 120 analyzes a restriction signal received from the radio base station 200A and extracts information such as the congestion state of a circuit domain or packet domain, a restriction ratio, or the like. The control circuit 120 selects a proper speech outgoing/incoming scheme for the radio communication apparatus 100A in accordance with each kind of information extracted by analysis. In this case, a speech outgoing/incoming scheme indicates a domain, a speech communication scheme, or a CODEC. In addition, the control circuit 120 performs communication by using the automatically selected proper speech communication scheme, domain, or CODEC. There are various kinds of speech communication schemes and CODECs. First of all, the speech communication schemes include, for example, a full duplex communication scheme used for general speech communication, IMS (Internet Protocol Multimedia Subsystems) which performs full duplex communication on a packet communication network, and a PoC communication scheme (Push to talk over Cellular) which performs half duplex communication on a packet communication network. The CODECs include, for example, AMR (Advanced Multi Rate CODEC) 12.2, AMR 10.2, AMR 7.95, AMR 7.40, AMR 6.70, AMR 5.90, AMR 5.15, AMR 4.75, GSM (Global System for Mobile Communications) FR (Full Rate), and GSM HR (Half Rate).

In this case, the control circuit 120 can comprise for example, a circuit including a CPU (Central Processing Unit), MPU (Micro Processing Unit), or the like as an arithmetic processing function.

The storage circuit 130 stores a program associated with a speech communication scheme or a CODEC. In this case, a CODEC may be implemented by a circuit provided for each type of CODEC instead of a program. In addition to a CODEC or the like, the storage circuit 130 stores, for example, a program which is necessary for the radio communication apparatus 100A to operate, and a telephone directory holding personal information such as the names or telephone numbers of speech communication partners. In this case, the storage circuit 130 can be one of various storage media having a function of storing data, e.g., a semiconductor memory and a hard disk.

The interface circuit 140 outputs, for example, data input by the user of the radio communication apparatus 100A to the control circuit 120. Alternatively, the interface circuit 140 notifies the user of the radio communication apparatus 100A of data input from the control circuit 120. More specifically, when the radio communication apparatus 100A is configured to automatically set a speech outgoing/incoming scheme, the interface circuit 140 may be configured to notify the user of a change of setting for the speech communication scheme or CODEC through, for example, a window displaying images or text or sound. In addition, when the user is to set a speech outgoing/incoming scheme for the radio communication apparatus 100A, the interface circuit 140 may be configured to set a speech outgoing/incoming scheme through, for example, a keyboard for inputting data, a window displaying images or text to the user, or a speaker which produces sound.

The interface circuit 140 can also notify the user, by using sound, text, or images, when the speech communication scheme automatically changes.

The antenna 150 transmits data input from the transmission/reception circuit 110 to the radio base station 200A. In addition, the antenna 150 outputs data received from the radio base station 200A to the transmission/reception circuit 110.

The relay station 300 manages the radio base stations 200A and 200B. The relay station 300 is, for example, an RNC (Radio Network Controller) or an MSC (Mobile Services Switching Center).

Figure 4:
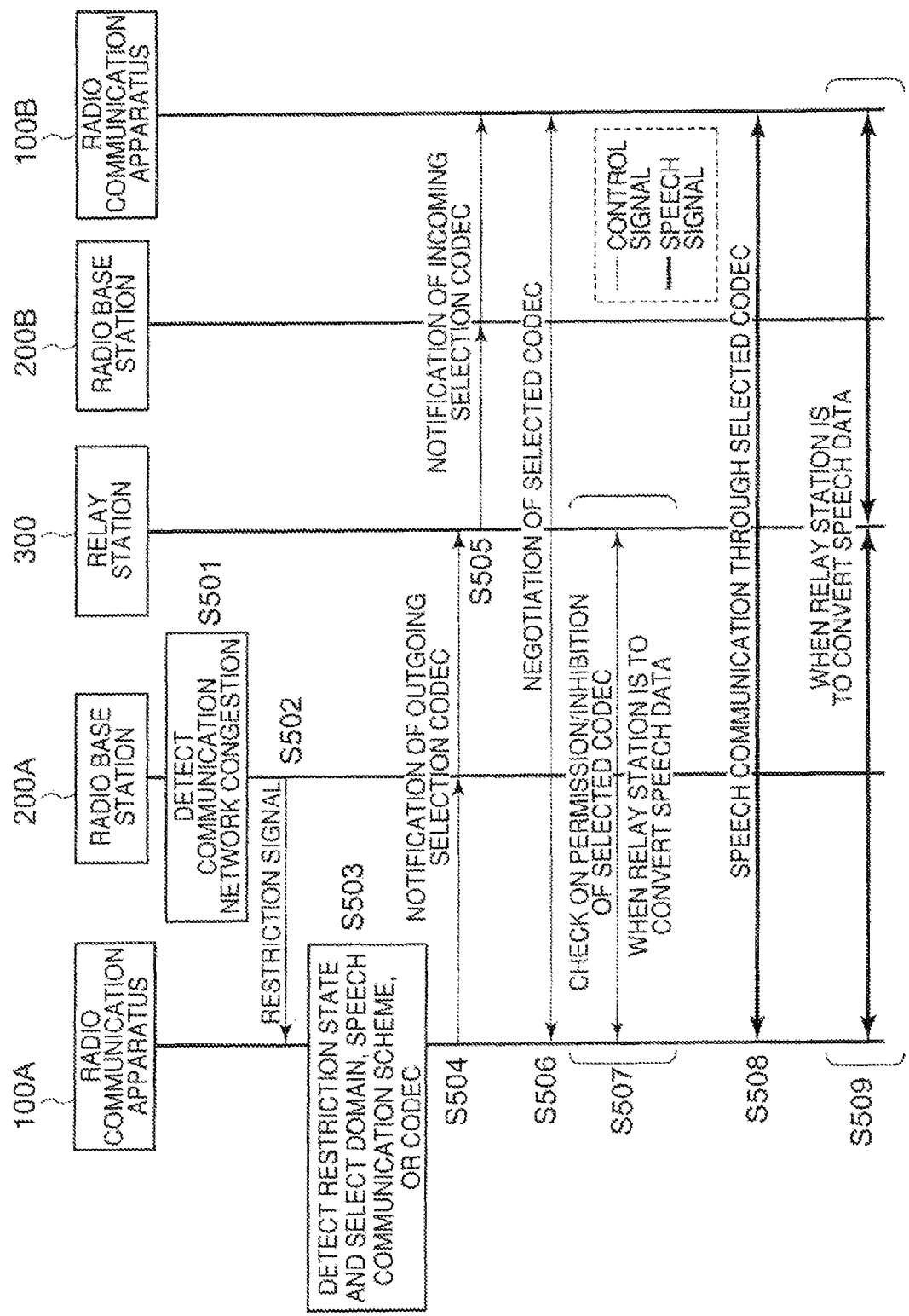
FIG. 4 is a view for explaining the operation of the communication network control system according to the first exemplary embodiment of the present invention.
Figure 5:
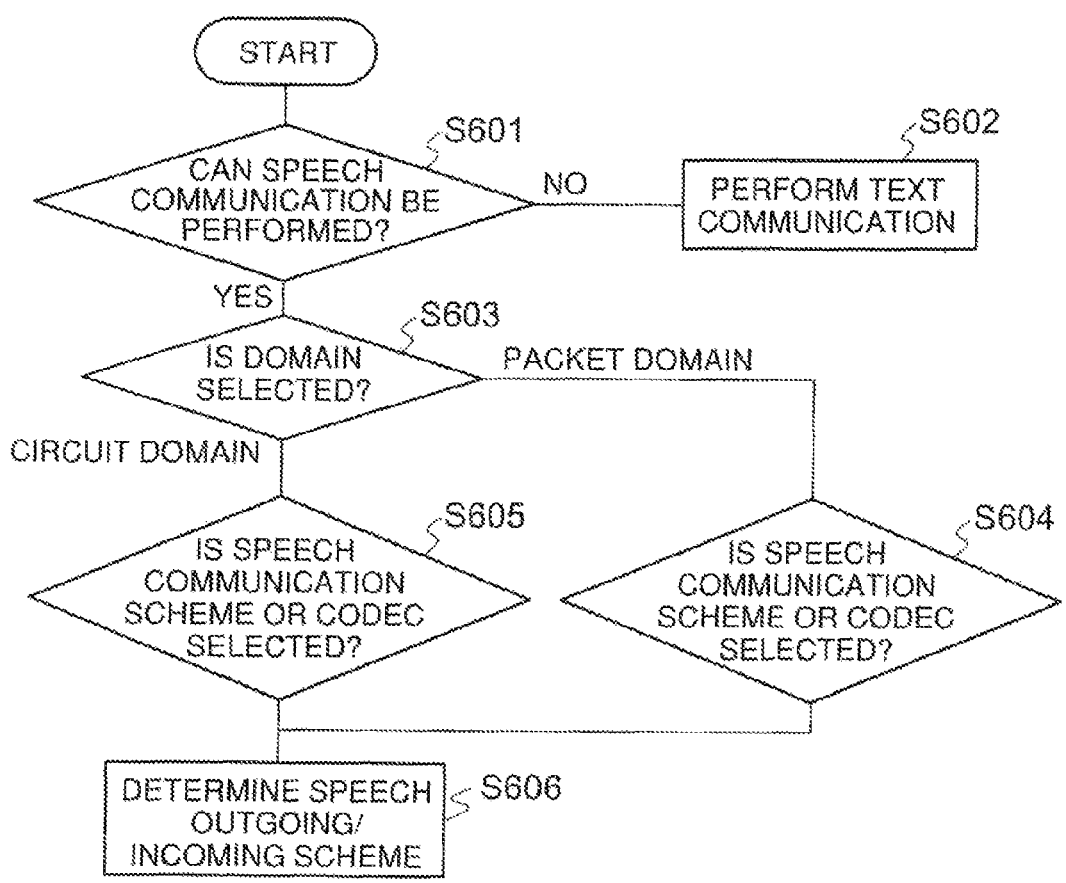
FIG. 5 is a flowchart showing a method of making the control circuit of the communication network control system according to the first exemplary embodiment of the present invention select a speech outgoing/incoming scheme.

The operation of the communication network control system according to the first exemplary embodiment will be described with reference to FIGS. 4 and 5 with focus being on FIG. 4.

First of all, the congestion monitoring circuit 230 of the radio base station 200A calculates the congestion state of a circuit domain or packet domain or a restriction ratio, and outputs the congestion state, restriction ratio, or the like (which are sometimes generically called communication network information) to the control circuit 220 (S501). The control circuit 220 then transmits, to the radio communication apparatus 100A, a restriction signal generated on the basis of the congestion state, restriction ratio, or the like input from the congestion monitoring circuit 230 (S502).

An example of an automatic congestion detection method and a restriction ratio calculation method in the radio base station 200A will be described below. According to the automatic congestion detection method, for example, the control circuit 220 measures a CPU usage rate in a given cycle, and determines congestion, upon consecutively observing X (X is a predetermined value) numerical values exceeding a threshold. Assume that A represents this determination. In addition, the control circuit 220 measures the number of packets processed per unit time in advance. The control circuit 220 determines the maximum number of packets that can be processed per unit time at the nth measurement from the (n−1)th and (n−2)th measurements. When the number of packets exceeding the maximum number of packets that can be processed is received at the nth measurement, the control circuit 220 determines congestion. Assume that B represents this determination.

The restriction ratio calculation method will be described next. Assume that five restriction ratios are set stepwise as 0, 25, 50, 75, and 100%. In this case, at the time of the determination A, the restriction ratio is increased by two steps. At the time of the determination B, the restriction ratio is decreased by one step. If no congestion is determined the unit time after the restriction ratio is increased, the restriction is gradually cancelled by decreasing the restriction ratio by one step. The control circuit 220 adjusts the restriction ratio in the above manner.

Upon receiving a restriction signal from the radio base station 200A, the control circuit 120 of the radio communication apparatus 100A analyzes the restriction signal to extract a congestion state, restriction ratio, or the like. The control circuit 120 then automatically selects a proper domain, speech communication scheme, or CODEC in accordance with the restriction ratio (S503), and notifies the relay station 300 of the selected domain, speech communication scheme, or CODEC (S504).

A method of selecting a domain, speech communication scheme, or CODEC, which the control circuit 120 performs, will be described with reference to FIG. 5. First of all, the control circuit 120 determines, on the basis of the congestion state of a circuit domain or packet domain or the restriction ratio extracted from the restriction signal, whether to permit the user to perform speech communication (S601). If speech communication is not permitted, the user can perform text communication (S602). If, for example, the restriction ratio becomes 50% or more in the standby state of the radio communication apparatus, the apparatus is set in the text communication mode. If, however, the restriction ratio becomes 50% or more during speech communication of the radio communication apparatus, it suffices to continue the speech communication. If possible, a domain is selected on the basis of the congestion state of a circuit domain or packet domain, the restriction ratio, or the like (S603). More specifically, the control circuit 120 selects, for example, a circuit domain or a packet domain which has a higher resource margin by comparing the congestion states of the domains with each other. The control circuit 120 then selects a speech communication scheme and a CODEC (S604 and S605). More specifically, for example, priorities are assigned to the speech communication schemes in advance. If priority is given to conversation, priority is given to full duplex communication. If priority is given to sound quality, priority is given to half duplex communication. The control circuit 120 then calculates speech communication scheme (for example, 1 for general speech communication and 0.5 for PoC communication)× general rate (e.g., 12.2 if AMR 12.2 is the general rate). If priority is given to full duplex communication and the restriction ratio is 25%, the control circuit 120 performs calculation as follows:

$$1 \times A/12.2 < 0.75$$

$$A < 9.12$$

In this case, therefore, the control circuit 120 selects AMR 7.95 or less or GSM HR. If priority is given to half duplex communication and the restriction ratio is 25%, the control circuit 120 performs calculation as follows:

$$0.5 \times A/12.2 < 0.75$$

$$A < 18.3$$

In this case, therefore, the control circuit 120 can select all CODECs. With the above operation, a speech outgoing/incoming scheme is determined (S606).

The operation of the communication network control system according to the first exemplary embodiment will be further described by referring back to FIG. 4. The relay station 300 transmits a notification received from the radio communication apparatus 100A to the radio communication apparatus 100B of the speech communication partner through the radio base station 200B (S505). The radio communication apparatuses 100A and 100B then negotiate the selected CODEC and start speech communication (S506 and S508). If the relay station 300 needs to convert speech data, the radio communication apparatuses start speech communication after permission/inhibition of the selected CODEC is checked between the radio communication apparatus 100A and the relay station 300 (S507 and S509).

Making the communication network control system of the first exemplary embodiment select a proper speech outgoing/incoming scheme by using a circuit domain or a packet domain makes it possible to perform communication even at the time of communication network congestion. More specifically, for example, this allows speech communication even at the time of a disaster, and hence makes it possible to check damage in a disaster area or the safety of disaster victims.

According to the first exemplary embodiment, it suffices if the radio communication apparatus 100B of a speech communication partner can perform PoC communication even if it is not compatible with the communication network control system. In addition, even if a speech communication partner is a radio communication apparatus, fixed telephone, or IP (Internet Protocol) telephone which is not compatible with PoC communication, the partner can perform PoC communication by using the PoC system disclosed in Japanese Patent Application No. 2006-092297. Using this arrangement makes it possible to perform speech communication, with proper speech, even with a radio communication apparatus which does not have an arrangement capable of PoC communication, at the time of communication network congestion, thereby improving convenience.

The first exemplary embodiment takes the form in which the radio communication apparatus automatically selects a speech communication scheme or a CODEC. However, the first exemplary embodiment may take a form of making the user select a speech communication scheme or CODEC for the radio communication apparatus through the interface circuit 140, e.g., sound or a display window, instead of automatically selecting it.

Second Exemplary Embodiment

The second exemplary embodiment of the present invention will be described next with reference to FIG. 6. The following is the difference between the second exemplary embodiment and the first exemplary embodiment. The first exemplary embodiment has exemplified the communication through a radio base station in the communication network of the $2^{nd}$ Generation or $3^{rd}$ Generation. In contrast, the second exemplary embodiment will exemplify the operation of selecting one of communication through a radio base station and communication through a WLAN AP (Wireless Local Area Network Access Point).

Figure 6:
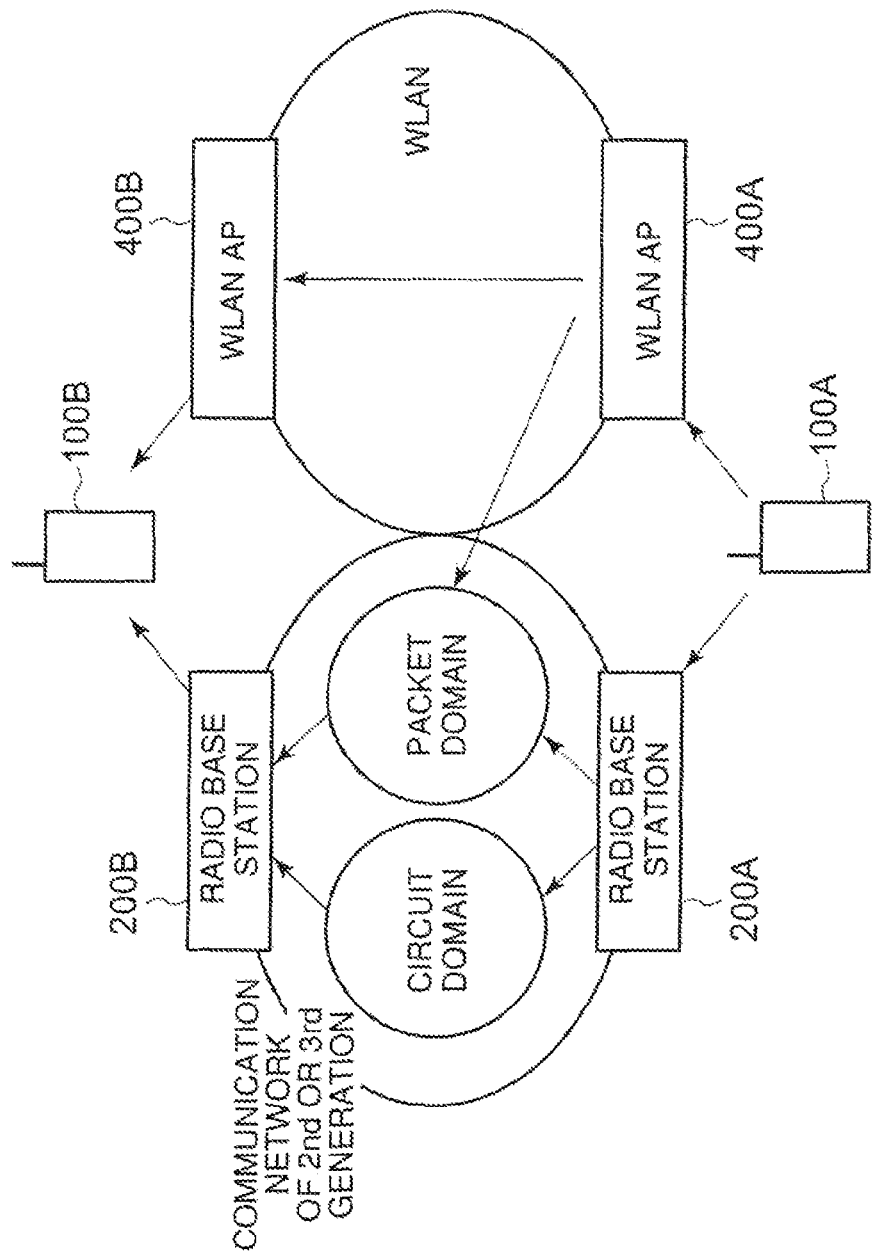
FIG. 6 is a schematic view showing the arrangement of a communication network control system according to the second exemplary embodiment of the present invention.

FIG. 6 shows the arrangement of a communication network control system according to the second exemplary embodiment. The communication network control system according to the second exemplary embodiment comprises radio communication apparatuses 100A and 100B, radio base stations 200A and 200B, and WLAN APs 400A and 400B. In this case, the radio communication apparatuses 100A and 100B and the radio base stations 200A and 200B use the same arrangements as those in the first exemplary embodiment.

The operation of the communication network control system according to the second exemplary embodiment will be described with reference to FIG. 6.

A control circuit 120 of the radio communication apparatus 100A receives a restriction signal from the radio base station 200A, and extracts information of a restriction ratio or congestion state. The control circuit 120 selects between performing communication through the radio base station 200A and performing communication through the WLAN AP 400A on the basis of the information of the restriction ratio or congestion state. If, for example, both the restriction ratios of a circuit domain and packet domain are 75% or more, the control circuit 120 selects communication through the WLAN AP 400A. Upon selecting the WLAN AP 400A, the control circuit 120 selects a route connecting to the WLAN AP 400B through a WLAN C or a route connecting to a packet domain in a communication network D of the $2^{nd}$ Generation or $3^{rd}$ Generation on the basis of the information of the restriction ratio or congestion state. Thereafter, the radio communication apparatus 100A communicates with the radio communication apparatus 100B through the selected route. Upon selecting the radio base station 200A, the control circuit 120 performs the same operation as in the first exemplary embodiment (see FIG. 4).

With the above operation, the communication network control system according to the second exemplary embodiment can communicate even under communication network congestion both in a circuit domain and a packet domain by selecting communication through the WLAN AP. In this manner, for example, the communication network control system increases the chance of communicating with disaster victims. when checking a damage degree in a disaster area or the safety of disaster victims.

The second exemplary embodiment has exemplified the two choices, i.e., communication through a radio base station in the communication network D of the $2^{nd}$ Generation or $3^{rd}$ Generation and communication through a WLAN AP. However, the second exemplary embodiment may be configured to select either communication through a radio base station in the communication network D of the $2^{nd}$ Generation or $3^{rd}$ Generation or communication through a radio base station in a WiMax (Worldwide Interoperability for Microwave Access) system. Furthermore, the second exemplary embodiment may be configured to manually select communication through a radio base station, communication through a WLAN AP, or communication through a radio base station in a WiMax system. The communication through the radio base station, the communication through the WLAN AP or the communication through the radio base station in the WiMax system may be manually selected through the interface circuit 140 instead of automatically selecting one of them.

In addition, in the second exemplary embodiment, a WLAN AP transmits no restriction signal. However, the second exemplary embodiment may be configured to transmit a restriction signal from a WLAN AP or a radio base station in a WiMax system.

Furthermore, in the second exemplary embodiment, when communication through a WLAN AP is selected, a CODEC or a communication scheme is determined by initialization. However, the second exemplary embodiment may be configured to receive a restriction signal from a WLAN AP upon selection of communication through the WLAN AP and select a communication scheme or a CODEC on the basis of the restriction signal. That is, in the second exemplary embodiment, for example, upon selecting communication through a WLAN AP, the control circuit 120 of the radio communication apparatus 100A receives a restriction signal from the WLAN AP. The control circuit 120 then selects full duplex communication or half duplex communication on the basis of the restriction signal. Thereafter, the radio communication apparatus 100A may select a code type and start communicating with the radio communication apparatus 100B as a communication partner. In addition, when communication through a WLAN AP is replaced with communication through a radio base station in a WiMax system, the above operation may be performed. Furthermore, the second exemplary embodiment may be configured to manually select full duplex communication or half duplex communication through an interface circuit 140 instead of automatically selecting one of them.

Those skilled in the art can easily make various modifications to the above exemplary embodiments. The present invention is not therefore limited to the above exemplary embodiments, and should be interpreted in the broadest scope defined by appended claims and their equivalents.

While the invention has been particularly shown and described with reference to exemplary embodiments thereof, the invention is not limited to those embodiments. It will be understood by those of ordinary skill in the art that various changes in form and details may be made therein without departing from the sprit and scope of the present invention as defined by the claims.

In addition to the foregoing exemplary aspect of the radio communication apparatus, the present invention has the following exemplary embodiments.

As a third exemplary embodiment, in the radio communication apparatus, it is characterized in that the selected speech outgoing/incoming scheme is a domain scheme.

As a fourth exemplary embodiment, in the radio communication apparatus, it is characterized in that the selected speech outgoing/incoming scheme is a speech communication scheme.

As a fifth exemplary embodiment, in the radio communication apparatus, it is characterized in that the selected speech outgoing/incoming scheme is a CODEC.

As a sixth exemplary embodiment, in the radio communication apparatus, it is characterized in that the restriction signal from the radio base station indicates communication network information in the radio base station.

As a seventh exemplary embodiment, in the radio communication apparatus, it is characterized by further comprising an interface circuit which notifies a user of information or allows the user to input information, and a circuit which causes the user to select the speech communication scheme by using the interface circuit.

As an eighth exemplary embodiment, in the radio communication apparatus, it is characterized in that the speech outgoing/incoming scheme is automatically selected.

As a ninth exemplary embodiment, in the radio communication apparatus, it is characterized in that the radio communication apparatus is a portable terminal.

As a tenth exemplary embodiment, there is provided a communication network control system of the present invention comprises: a radio base station and a radio communication apparatus, in which the radio base station comprises a first antenna which transmits a restriction signal to the radio communication apparatus; a transmission circuit which encodes the restriction signal transmitted to the radio communication apparatus; and a first control circuit which generates the restriction signal, and the radio communication apparatus comprises a second antenna which receives the restriction signal from the radio base station; a reception circuit which decodes the restriction signal received by the antenna; and a second control circuit which controls the radio communication apparatus, wherein the second control circuit is configured to select a proper speech outgoing/incoming scheme for performing communication with the radio base station on the basis of the restriction signal received by the second antenna.

As an 11th exemplary embodiment, in the communication network control system, it is characterized in that the selected speech outgoing/incoming scheme is a domain scheme.

As a 12th exemplary embodiment, in the communication network control system, it is characterized in that the selected speech outgoing/incoming scheme is a speech communication scheme.

As a 13th exemplary embodiment, in the communication network control system, it is characterized in that the selected speech outgoing/incoming scheme is a CODEC.

As a 14th exemplary embodiment, in the communication network control system, it is characterized in that the restriction signal from the radio base station indicates communication network information in the radio base station.

As a 15th exemplary embodiment, in the communication network control system, it is characterized by further comprising an interface circuit which notifies a user of information or allows the user to input information, and a circuit which causes the user to select the speech communication scheme by using the interface circuit.

As a 16th exemplary embodiment, in the communication network control system, it is characterized in that the speech outgoing/incoming scheme is automatically selected.

As a 17th exemplary embodiment, in the communication network control system, it is characterized in that the radio communication apparatus is a portable terminal.

As an 18th exemplary embodiment, in the communication network control system, it is characterized by further comprising a communication control apparatus which interconverts a communication control signal used in a telephone communication network and a communication control signal used in a PoC (Push-to-Talk over Cellular) system; and a speech signal processing apparatus which interconverts a full duplex speech signal used in the telephone communication network and a half duplex speech signal used in the PoC system.

As a 19th exemplary embodiment, in the communication network control system, the system further comprises a radio base station, a relay station, a first radio communication apparatus, and a second radio communication apparatus, wherein the radio base station monitors a congestion state, calculates a restriction ratio, generates a restriction signal containing communication network information, and transmits the restriction signal to the first radio communication apparatus, and wherein the first radio communication apparatus extracts the communication network information from the received restriction signal, selects a domain on the basis of the congestion state or the restriction ratio, and communicates with the second radio communication apparatus through the relay station by negotiating a CODEC with the second radio communication apparatus.

As a 20th exemplary embodiment, there is provided a communication control method in the radio communication apparatus of the present invention comprises the steps of: receiving a restriction signal from the radio base station; decoding the received restriction signal; and selecting a domain for communication with the radio base station on the basis of the restriction signal.

As a 21st exemplary embodiment, in the communication control method, which further comprises the steps of: in the radio base station, transmitting a restriction signal to the radio communication apparatus; encoding the restriction signal transmitted. to the radio communication apparatus; and generating the restriction signal, and in the radio communication apparatus, receiving the restriction signal from the radio base station; decoding the restriction signal and selecting a domain for communication with the radio base station on the basis of the decoded restriction signal.

What is claimed is:

1. A radio terminal in a communication system, said radio terminal comprising:
   a receiver for receiving a signal indicating a congestion state in said communication system detected and generated by a radio base station of said system from said radio base station; and
   a controller, said controller being configured to select a proper rate of CODEC of said radio terminal in accordance with the congestion state by analyzing the signal received from said radio base station, and
   said controller being configured to negotiate said selected rate with another radio terminal of said system as a speech communication partner.

2. A communication system including a radio base station and a plurality of radio terminals, said radio base station comprising:
   a monitor for detecting a congestion state in said communication system; and
   a transmitter for generating a signal indicating the congestion state to a radio terminal and transmitting said signal; and each of said radio terminals comprising:
   a receiver for receiving said signal, and
   a controller,
   said controller being configured to select a proper rate of CODEC of said radio terminal in accordance with the congestion state by analyzing the signal received from said radio base station, and
   said controller being configured to negotiate said selected rate with another radio terminal of said system as a speech communication partner.

3. A control method of a radio terminal in a communication system, said method comprising the steps of:
   receiving a signal indicating a congestion state in said communication system detected and generated by a radio base station of said system from the radio base station;
   selecting a proper rate of CODEC of said radio terminal in accordance with the congestion state by analyzing the signal received from said radio base station; and
   negotiating said selected rate with another radio terminal of said system as a speech communication partner.

4. A control method of a communication system including a radio base station and a plurality of radio terminals, said method comprising the steps of:
   detecting, at the radio base station, a congestion state in said communication system;
   generating, at the radio base station, a signal indicating the congestion state;
   sending, at the radio base station, said signal to a radio terminal;
   receiving at the radio terminal a signal indicating the congestion state detected by said radio base station;
   selecting, at said radio terminal, a proper rate of CODEC in accordance with the congestion state by analyzing the signal indicating the congestion state received from said radio base station; and
   negotiating, at said radio terminal, said selected rate with another radio terminal of said system as a speech communication partner.

* * * * *